(12) United States Patent
Amundsen et al.

(10) Patent No.: US 9,389,323 B2
(45) Date of Patent: Jul. 12, 2016

(54) APPARATUS FOR MARINE SEISMIC SURVEY

(71) Applicant: Statoil Petroleum AS, Stavanger (NO)

(72) Inventors: Lasse Amundsen, Trondheim (NO); Harald Westerdahl, Dal (NO); Mark Thompson, Trondheim (NO)

(73) Assignee: Statoil Petroleum AS, Stavanger (NO)

( * ) Notice: Subject to any disclaimer, the term of this patent is extended or adjusted under 35 U.S.C. 154(b) by 199 days.

(21) Appl. No.: 14/313,561

(22) Filed: Jun. 24, 2014

(65) Prior Publication Data

US 2014/0334256 A1    Nov. 13, 2014

Related U.S. Application Data

(63) Continuation of application No. 13/078,628, filed on Apr. 1, 2011, now Pat. No. 9,081,111.

(60) Provisional application No. 61/321,670, filed on Apr. 7, 2010.

(30) Foreign Application Priority Data

Apr. 1, 2010   (GB) .................................. 1005574.7

(51) Int. Cl.
   *G01V 1/18*    (2006.01)
   *G01V 1/28*    (2006.01)
   *G01V 1/38*    (2006.01)

(52) U.S. Cl.
   CPC ........ *G01V 1/18* (2013.01); *G01V 1/181* (2013.01); *G01V 1/186* (2013.01); *G01V 1/284* (2013.01); *G01V 1/38* (2013.01)

(58) Field of Classification Search
   CPC ........... G01V 1/284; G01V 1/38; G01V 1/18; G01V 1/181; G01V 1/186
   USPC .......................................................... 367/15
   See application file for complete search history.

(56) References Cited

U.S. PATENT DOCUMENTS

| | | | |
|---|---|---|---|
| 3,275,097 | A | 9/1966 | Pavey, Jr. |
| 3,590,919 | A | 7/1971 | Talley, Jr. |
| 4,378,848 | A | 4/1983 | Milberger |
| 4,547,869 | A | 10/1985 | Savit |

(Continued)

FOREIGN PATENT DOCUMENTS

| | | |
|---|---|---|
| DE | 4004228 | 8/1991 |
| EP | 0018053 | 10/1980 |

(Continued)

OTHER PUBLICATIONS

Written Opinion and International Search Report from International Application No. PCT/EP2010/057403 dated Jul. 13, 2011.

(Continued)

*Primary Examiner* — Daniel L Murphy
(74) *Attorney, Agent, or Firm* — Patterson Thuente Pederson, P.A.

(57) ABSTRACT

An apparatus for conducting a marine seismic survey is disclosed. The apparatus includes a plurality of sensors configured to measure water pressure, a horizontal derivative of the pressure in two orthogonal directions, vertical particle velocity or acceleration of the water, and a horizontal derivative of the vertical particle velocity or acceleration in two orthogonal directions.

11 Claims, 6 Drawing Sheets

(56) References Cited

U.S. PATENT DOCUMENTS

| | | |
|---|---|---|
| 4,576,479 A | 3/1986 | Downs |
| 4,583,095 A | 4/1986 | Peterson |
| 4,603,407 A | 7/1986 | Cowles |
| 4,843,597 A | 6/1989 | Gjessing et al. |
| 4,862,422 A | 8/1989 | Brac |
| 4,909,671 A | 3/1990 | Skjong |
| 4,942,557 A | 7/1990 | Seriff |
| 4,970,699 A | 11/1990 | Bucker et al. |
| 4,992,995 A | 2/1991 | Favret |
| 5,029,023 A | 7/1991 | Bearden et al. |
| 5,070,483 A | 12/1991 | Berni |
| 5,109,362 A | 4/1992 | Berni |
| 5,144,588 A | 9/1992 | Johnston et al. |
| 5,159,406 A | 10/1992 | Adler et al. |
| 5,317,383 A | 5/1994 | Berni |
| 5,444,619 A | 8/1995 | Hoskins |
| 5,477,324 A | 12/1995 | Berthelot et al. |
| 5,570,321 A | 10/1996 | Bernitsas |
| 5,671,136 A | 9/1997 | Willhoit, Jr. |
| 5,724,309 A | 3/1998 | Higgs |
| 5,892,732 A | 4/1999 | Gersztenkorn et al. |
| 5,940,777 A | 8/1999 | Keskes |
| 5,987,388 A | 11/1999 | Crawford et al. |
| 6,011,557 A | 1/2000 | Keskes et al. |
| 6,011,753 A | 1/2000 | Chien |
| 6,026,057 A | 2/2000 | Byun et al. |
| 6,028,817 A | 2/2000 | Ambs |
| 6,049,760 A | 4/2000 | Scott |
| 6,081,481 A | 6/2000 | Sabatier et al. |
| 6,134,966 A | 10/2000 | Donskoy et al. |
| 6,141,440 A | 10/2000 | Melen |
| 6,182,015 B1 | 1/2001 | Altan et al. |
| 6,301,193 B1 | 10/2001 | Martin et al. |
| 6,456,565 B1 | 9/2002 | Grall et al. |
| 6,473,695 B1 | 10/2002 | Chutov et al. |
| 6,536,528 B1 | 3/2003 | Amin et al. |
| 6,672,391 B2 | 1/2004 | Anderson et al. |
| 6,725,163 B1 | 4/2004 | Trappe et al. |
| 6,735,526 B1 | 5/2004 | Meldahl et al. |
| 6,739,165 B1 | 5/2004 | Strack |
| 6,752,214 B2 | 6/2004 | Amin et al. |
| 6,772,840 B2 | 8/2004 | Headworth |
| 6,787,758 B2 | 9/2004 | Tubel et al. |
| 6,788,618 B2 | 9/2004 | Clayton et al. |
| 6,873,571 B2 | 3/2005 | Clayton et al. |
| 7,011,152 B2 | 3/2006 | Soelvik |
| 7,032,658 B2 | 4/2006 | Chitwood et al. |
| 7,065,449 B2 | 6/2006 | Brewster et al. |
| 7,068,568 B2 | 6/2006 | Robertsson |
| 7,137,451 B2 | 11/2006 | Smith |
| 7,261,162 B2 | 8/2007 | Deans et al. |
| 7,311,151 B2 | 12/2007 | Chitwood et al. |
| 7,383,133 B1 | 6/2008 | Scott |
| 7,386,397 B2 | 6/2008 | Amundsen et al. |
| 7,463,549 B2 | 12/2008 | Naess |
| 7,530,398 B2 | 5/2009 | Balkanyi et al. |
| 7,615,893 B2 | 11/2009 | Biester et al. |
| 7,660,188 B2 | 2/2010 | Meldahl |
| 7,703,535 B2 | 4/2010 | Benson |
| 7,715,988 B2 | 5/2010 | Robertsson et al. |
| 7,720,609 B2 | 5/2010 | Meldahl |
| 7,721,807 B2 | 5/2010 | Stoisits et al. |
| 7,793,724 B2 | 9/2010 | Daniel et al. |
| 7,817,495 B2 | 10/2010 | Ozbek et al. |
| 7,918,283 B2 | 4/2011 | Balkanyi et al. |
| 7,933,003 B2 | 4/2011 | Meldahl et al. |
| 7,958,938 B2 | 6/2011 | Crossley et al. |
| 7,992,632 B2 | 8/2011 | Bornes et al. |
| 8,033,336 B2 | 10/2011 | Benson |
| 8,089,390 B2 | 1/2012 | Jones et al. |
| 8,115,491 B2 | 2/2012 | Alumbaugh et al. |
| 8,212,410 B2 | 7/2012 | Biester et al. |
| 8,351,298 B2 | 1/2013 | De Kok et al. |
| 2002/0126575 A1 | 9/2002 | Bittleston |
| 2003/0060102 A1 | 3/2003 | Ambs |
| 2004/0015296 A1 | 1/2004 | Causse et al. |
| 2004/0022125 A1 | 2/2004 | Clayton et al. |
| 2004/0122593 A1 | 6/2004 | Haldorsen |
| 2004/0144543 A1 | 7/2004 | Appleford et al. |
| 2004/0228214 A1 | 11/2004 | Tulett |
| 2004/0262008 A1 | 12/2004 | Deans et al. |
| 2005/0068850 A1 | 3/2005 | Muyzert et al. |
| 2005/0152220 A1 | 7/2005 | Kritski et al. |
| 2005/0178556 A1 | 8/2005 | Appleford et al. |
| 2005/0209783 A1 | 9/2005 | Bittleston |
| 2005/0288862 A1 | 12/2005 | Rode et al. |
| 2006/0098529 A1 | 5/2006 | Anderson et al. |
| 2006/0153005 A1 | 7/2006 | Herwanger et al. |
| 2006/0175062 A1 | 8/2006 | Benson |
| 2006/0285435 A1 | 12/2006 | Robertsson |
| 2006/0285437 A1 | 12/2006 | Sinha et al. |
| 2007/0075708 A1 | 4/2007 | Reddig et al. |
| 2007/0299614 A1 | 12/2007 | Dewarrat |
| 2008/0019215 A1 | 1/2008 | Robertsson et al. |
| 2008/0288173 A1 | 11/2008 | Saenger |
| 2009/0128800 A1 | 5/2009 | Meldahl et al. |
| 2009/0154291 A1 | 6/2009 | Ferber |
| 2009/0204330 A1 | 8/2009 | Thomsen et al. |
| 2010/0128561 A1 | 5/2010 | Meldahl et al. |
| 2010/0133901 A1 | 6/2010 | Zhang et al. |
| 2010/0171501 A1 | 7/2010 | Alumbaugh et al. |
| 2010/0211323 A1 | 8/2010 | Ozdemir et al. |
| 2010/0252260 A1 | 10/2010 | Fowler et al. |
| 2010/0332139 A1 | 12/2010 | Bruun et al. |
| 2011/0046885 A1 | 2/2011 | Bussat et al. |
| 2011/0085420 A1 | 4/2011 | Bussat et al. |
| 2011/0242935 A1 | 10/2011 | Amundsen et al. |
| 2011/0290497 A1 | 12/2011 | Stenevik |

FOREIGN PATENT DOCUMENTS

| | | |
|---|---|---|
| EP | 1403662 | 3/2004 |
| EP | 1879052 | 1/2008 |
| FR | 2765344 | 12/1998 |
| GB | 2001021 | 1/1979 |
| GB | 2299108 | 9/1996 |
| GB | 2331971 | 11/1999 |
| GB | 2342081 | 4/2000 |
| GB | 2347744 | 9/2000 |
| GB | 2364388 | 1/2002 |
| GB | 2410635 | 8/2005 |
| GB | 2416835 | 8/2008 |
| GB | 2454745 | 5/2009 |
| GB | 2460170 | 11/2009 |
| JP | 2005275540 | 10/2005 |
| RU | 9533 | 1/1900 |
| RU | 2072534 | 1/1997 |
| RU | 2121133 | 10/1998 |
| RU | 2246122 | 2/2005 |
| RU | 2 271 554 C1 | 3/2006 |
| SU | 1728825 | 4/1992 |
| WO | WO 91/13373 | 9/1991 |
| WO | WO 96/18116 | 6/1996 |
| WO | WO 97/33184 | 9/1997 |
| WO | WO 00/16125 | 3/2000 |
| WO | WO 01/61380 | 8/2001 |
| WO | WO 01/90782 | 11/2001 |
| WO | WO 02/27355 | 4/2002 |
| WO | WO 02/072999 | 9/2002 |
| WO | WO 02/073241 | 9/2002 |
| WO | WO 2004/003589 | 1/2004 |
| WO | WO 2004003339 | 1/2004 |
| WO | WO 2004/044617 | 5/2004 |
| WO | WO 2005/078479 | 8/2005 |
| WO | WO 2006/011826 | 2/2006 |
| WO | WO 2007/141725 | 12/2007 |
| WO | WO 2009042319 | 4/2009 |
| WO | WO2009151930 | 12/2009 |

OTHER PUBLICATIONS

Invitation to pay Additional Fees and Partial ISR from International Application No. PCT/EP2011/055140 dated May 30, 2012.

(56) References Cited

OTHER PUBLICATIONS

GB Search Report from GB Application No. 1005574.7 dated Jul. 21, 2010.
Bensen et al., Processing Seismic Ambient Noise Data to Obtain reliable Broad-band surface wave dispersion measurements, Jul. 28, 2006. 1239-1260.
Russian Office Action for Russian Application No. 2009122380/28030897 dated Jul. 11, 2011.
Artman, Brad, "Imaging passive seismic data," *Geophysics*, vol. 71, No. 4, pp. SI177-SI187, SP-002479903 (Jul.-Aug. 2006).
Berni, "Remote sensing of seismic vibrations by laser Dopper interferometry" Geophysics. vol. 59, No. 12. pp. 1856-1867. Dec. 1994.
Castagna, John P., et al., "Instantaneous spectral analysis: Detection of frequency shadows associated with hydrocarbons," *The Leading Edge*, XP-002461160, pp. 120-127 (Feb. 2003).
Daneshvar, M. Reza, et al., "Passive seismic imaging using microearthquakes," *Geophysics*, vol. 60, No. 4, pp. 1178-1186 (Jul.-Aug. 1995).
Hohl, Detlef, et al., "Passive Seismic Reflectivity Imaging with Ocean-Bottom Cable Data," *SEG/New Orleans 2006 Annual Meeting*, XP-002-156524343, pp. 1560 (2006).
Meldahl et al., Identifying Faults and Gas Chimneys Using Multiattributes and Neural Networks, May 2001. The Leading Edge, pp. 474-482.
Preliminary Examination Report—PCT/GB99/03039 Oct. 10, 2000.
International Search Report—PCT/GB2007/004348 dated Feb. 27, 2009 and Search Report GB 0622697.1 dated Feb. 16, 2007.
International Search Report—PCT/GB2008/051223 dated Apr. 29, 2009.
International Search Report—PCT/GB2006/003000 dated Dec. 29, 2006 and Search Report for GB 0516720.0 dated Nov. 8, 2006.
Application and File History for U.S. Appl. No. 09/786,905, filed Jun. 15, 2001, inventor Meldahl.
Application and File History for U.S. Appl. No. 10/867,174, filed Jun. 14, 2004, inventor Naess.
Application and File History for U.S. Appl. No. 10/519,882, filed Aug. 4, 2005, inventor Meldahl.
Application and File History for U.S. Appl. No. 11/795,105, filed Oct. 16, 2007, inventor Meldahl.
Application and File History for U.S. Appl. No. 11/990,558, filed Feb. 4, 2009, inventors Meldahl et al.
Application and File History for U.S. Appl. No. 12/743,338, filed May 17, 2010. Inventors Torstein.
Application and File History for U.S. Appl. No. 12/789,570, filed May 28, 2010. Inventors Stenevik.
Application and File History for U.S. Appl. No. 12/809,335, filed Jun. 18, 2010. Inventors Bussat.
Application and File History for U.S. Appl. No. 12/809,467, filed Jun. 18, 2010. Inventors Bussat.
Application and File History for U.S. Appl. No. 13/078,628, filed Apr. 1, 2011, inventor Amundsen.
Wood et al., Deceased Stability of Methane Hydrates in Marine Sediments Owing to Phase-Boundary Roughness, Dec. 12, 2002, Nature. vol. 420. pp. 656-660.
A. V. Gorbatikov et al., "Simulation of the Rayleigh Waves in the Proximity of the Scattering Velocity Heterogeneities. Exploring the Capabilities of the Microseismic Sounding Method," Izvestiya, Physics of the Solid Earth, 2011, pp. 354-369, vol. 47, No. 4, Pleiades Publishing, Ltd.
A. V. Gorbatikov et al, "Microseismic Field Affected by Local Geological Heterogeneities and Microseismic Sounding of the Medium," Izvestiya, Physics of the Solid Earth, 2008, pp. 577-592, vol. 44, No. 7, Pleiades Publishing, Ltd.
"Seismic Waves and Earth Oscillations," Voĉeadio, downloaded Jun. 29, 2013 from http://www.ucl.ac.uk/EarthSci/people/lidunka/GEOL2014/Revised%20Course/Detailed%20Lecture%20Notes/LECTURE4.pdf.
Goldstein, Classical Mechanics, $2^{nd}$ ed., Addison-Wesley, 1981, p. 164.
Knopoff et al., "Seismic Reciprocity," Geophysics, vol. 24, No. 4, Oct. 1959, pp. 681-691.

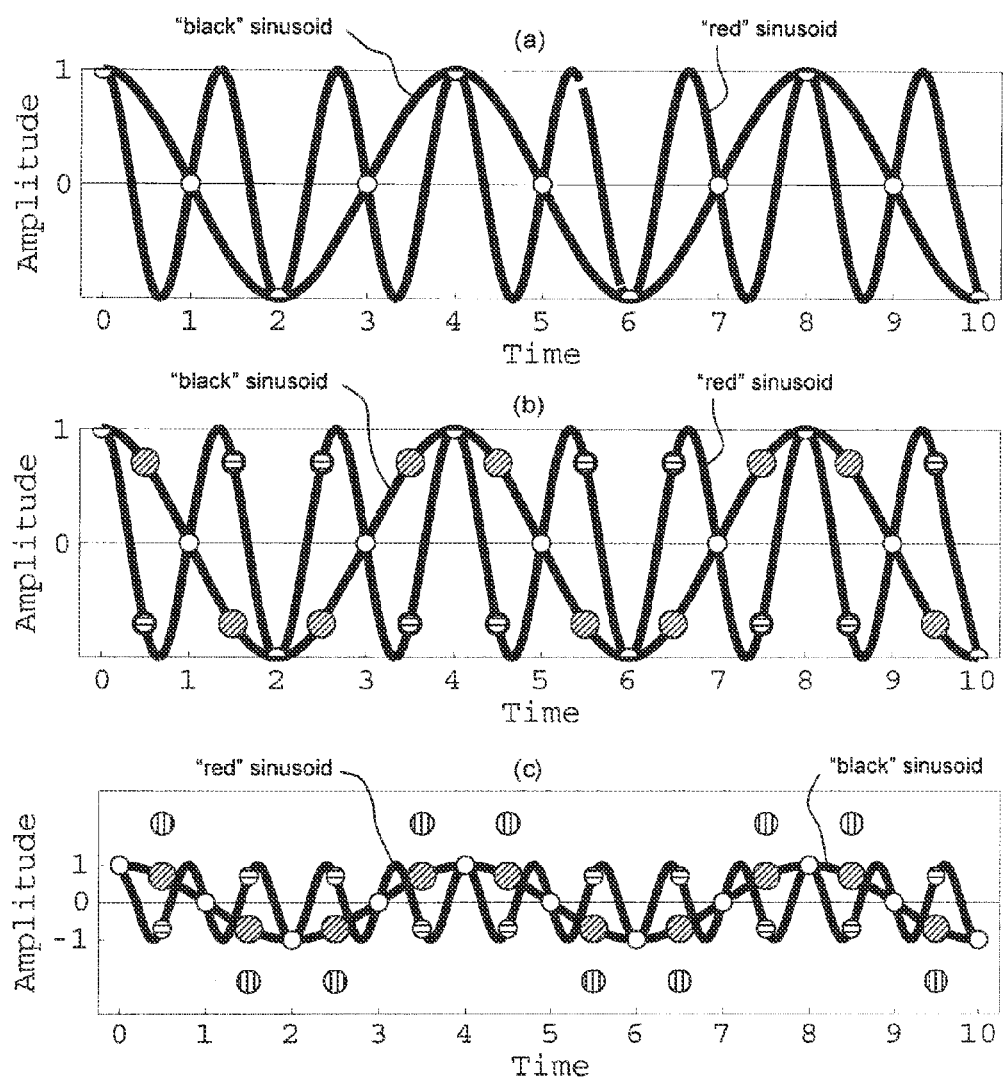

APPARATUS FOR MARINE SEISMIC SURVEY

RELATED APPLICATIONS

This application is a continuation of application Ser. No. 13/078,628 filed Apr. 1, 2011, which claims the benefit of U.S. Provisional Application No. 61/321,670 filed Apr. 7, 2010, which claims priority to GB Application No. 1005574.7 filed Apr. 1, 2010, each of which are incorporated herein in their entireties by reference.

TECHNICAL FIELD

The present invention relates to a method of providing seismic data. In particular, but not exclusively, the present invention relates to a method of providing marine seismic data.

BACKGROUND

A number of texts cover the principles of acquisition of marine seismic data (e.g., Sheriff and Geldart, 1995; Ikelle and Amundsen, 2005). There are several configurations of source and receiver distributions; those commonly used for petroleum exploration are (1) towed-streamer acquisition, where sources and receivers are distributed horizontally in the water column near the sea surface; (2) ocean-bottom seismic (OBS) acquisition, where the sources are towed in the water column and the receivers are on the seafloor; and (3) vertical-cable (VC) acquisition, where the sources are towed near the sea surface as in towed-streamer and OBS acquisition but the receivers are distributed in the water in a vertical array.

The receiver systems in these configurations are (1) normally hydrophones but possibly also vertically oriented geophones for towed-streamer acquisition; (2) hydrophones and three-component (3-C) geophones or accelerometers for OBS acquisition; and (3) hydrophones for VC acquisition. In the OBS experiment, the geophones or accelerometers are in contact with the seafloor so that the recording of shear waves is enabled. If the horizontally oriented geophones or accelerometers were not in contact with the seafloor, they would produce a measurement of the horizontal derivative of the pressure field.

The benefits of 2-C streamers are well known (Berni, 1984; Ruehle, 1984; Amundsen, 2001; Carlson et al., 2007). When introduced in 2007 by PGS, the geostreamer provided a step change in marine seismic acquisition. The geostreamer is equipped with both hydrophones and vertically oriented geophones so that, among others, up/down wavefield decomposition or receiver-side deghosting can be achieved, thereby enabling the acquisition of broadband seismic data.

Three-dimensional (3-D) up/down decomposition of the wavefield in the water column requires the proper measurement of both pressure on a hydrophone and vertical component of particle velocity on a vertically oriented geophone. To date, such measurements are not available in towed streamer acquisition due to the large cross-line separation between streamers, which typically is between 50-100 m.

Robertsson et al. (2006, 2008) state that 3-C geophone measurements would bring significant benefits to towed-marine seismic data if recorded and processed in conjunction with the pressure data. They show that particle velocity measurements can increase the effective Nyquist wavenumber by a factor of two or three, depending on how they are used.

Singh et al (2009) propose seismic acquisition using a plurality of streamers, with a streamer having a plurality of compact clusters of hydrophones and/or particle motion sensors. Cluster means a plurality of sensors of the same type that are used together. The streamer is adapted to provide gradient measurements of pressure with the objective to provide improved methods of interpolating seismic data between adjacent streamers.

SUMMARY

In ocean-bottom seismic (OBS) and vertical-cable (VC) surveying, receiver stations are stationary e.g. on the sea floor while a source vessel shoots on a predetermined x-y grid on the sea surface. To reduce exploration cost, the shot point interval often is so coarse that the data recorded at a given receiver station are undersampled and thus irrecoverably aliased. However, when the pressure field and its x- and y-derivatives are measured in the water column, the pressure can be reconstructed by interpolation. Likewise, if the vertical component of the particle velocity (or acceleration) and its x- and y-derivatives are measured, then also this component can be reconstructed by interpolation. The interpolation scheme can be any scheme that reconstructs the field from its sampled values and sampled derivatives. In the case that the two field's first-order derivatives are recorded the number of components is e.g. six. When their second-order derivatives are also measured, the number of components is e.g. ten. The properly interpolated measurements of pressure and vertical component of particle velocity from the multicomponent measurements allow proper up/down wavefield decomposition, or deghosting. New wavefield reconstruction methods as those suggested here are of significant interest since, presently, the seismic industry is in the process of developing multicomponent cables or streamers, and is in the process of carrying out research on new multicomponent sensors.

According to a first aspect of the present invention, there is provided a method of providing seismic data. A seismic source is actuated at a plurality of source locations. For each source location, a multicomponent seismic measurement is performed at at least one receiver location. A reconstructing method is applied to each multicomponent measurement to obtain additional data corresponding to source locations additional to the source locations at which the source was actuated.

Each of the additional locations can be disposed between ones of the source locations at which the source was actuated.

The additional data obtained from applying the reconstructing method can be considered as being for, or relating to, or being associated with, or relating to the wavefield at, the at least one receiver location at which the multicomponent seismic measurement was performed. For example, in the simple case of two source locations and a single receiver location, the additional data obtained from applying the reconstructing method might be considered as relating to the wavefield at that receiver location, thereby providing additional data for that receiver location as if a seismic source had been actuated at an additional source location to the two source locations actually used.

The source locations at which the source was actuated can comprise a regular grid.

The grid can be one of a triangular grid, a rectangular grid and a hexagonal grid.

For each source location, the multicomponent seismic measurement can be performed at a plurality of receiver locations, and the method can comprise applying a reconstructing method to each multicomponent measurement to obtain additional data corresponding to receiver locations additional to the receiver locations at which the multicomponent measurement was performed.

According to a second aspect of the present invention, there is provided a method of providing seismic data, comprising the steps of: actuating a seismic source at at least one source location; for each source location, performing a multicomponent seismic measurement at a plurality of receiver locations; and applying a reconstructing method to each multicomponent measurement to obtain additional data corresponding to receiver locations additional to the receiver locations at which the multicomponent measurement was performed.

Each of the additional receiver locations can be disposed between ones of the receiver locations at which the multicomponent measurement was performed.

The receiver locations at which the multicomponent measurement was performed can comprise a regular grid.

The grid can be one of a triangular grid, a rectangular grid and a hexagonal grid.

According to a third aspect of the present invention, there is provided a method of providing seismic data, comprising the steps of: actuating a seismic source at a plurality of source locations; for each source location, performing a multicomponent seismic measurement at a plurality of receiver locations; and applying a reconstructing method to each multicomponent measurement to obtain additional data corresponding to source locations additional to the source locations at which the source was actuated and/or additional data corresponding to receiver locations additional to the receiver locations at which the multicomponent measurement was performed.

The additional data can comprise data corresponding to at least one component of the multicomponent measurements.

The additional data can comprise pressure data.

The additional data can comprise upgoing and/or downgoing constituents of pressure data.

The additional data can comprise particle velocity related data.

The additional data can comprise vertical particle velocity component related data.

The additional data can comprise upgoing and/or downgoing constituents of vertical particle velocity component related data.

Each multicomponent measurement can comprise pressure data.

Each multicomponent measurement can comprise particle velocity related data.

The particle velocity related data can comprise at least one of particle velocity data, particle displacement data, and particle acceleration data.

Each multicomponent measurement can comprise pressure measurement and measures of derivatives of pressure with respect to first and second different directions.

The first and second directions can be Cartesian coordinate directions.

The first and second directions can be first and second horizontal directions.

The first and second directions can be first and second vertical directions.

Each multicomponent measurement can comprise vertical particle component velocity measurement and measures of derivatives of vertical particle component velocity with respect to third and fourth different horizontal directions.

The vertical particle component velocity measurement can be derived from a measure of a derivative of pressure with respect to a vertical direction.

The third and fourth directions can be horizontal Cartesian coordinate directions.

The derivative or each derivative of the vertical particle component velocity with respect to a horizontal direction can be derived from a measure of a derivative of a horizontal particle component velocity with respect to a vertical direction.

The derivative of the vertical particle component velocity with respect to the third horizontal direction can be derived from a measure of a derivative with respect to a vertical direction of a particle component velocity in the third horizontal direction.

The derivative of the vertical particle component velocity with respect to the fourth horizontal direction can be derived from a measure of a derivative with respect to a vertical direction of a particle component velocity in the fourth horizontal direction.

The derivative of the vertical particle component velocity with respect to third and fourth different horizontal directions could be obtained by using data from angular rotation sensors on the seabed (measuring rotation or rotation rate around the two horizontal directions).

The derivatives of the vertical particle component velocity can be obtained from measurements of rotation or rotation rate around the third and fourth horizontal directions.

Each of the derivatives can be a first or second or third order derivative.

The reconstructing method can comprise applying a sinc squared or sinc cubed or sinc to the power four interpolation.

Each derivative can be formed from a measurement of difference or particle displacement or particle velocity or particle acceleration.

The receiver location or each receiver location can be fixed.

The receiver location or each receiver location can comprise a receiver station disposed on or above the seabed, and/or in at least one cable on the seabed and/or orientated vertically in the water column.

The receiver location or each receiver location can comprise a receiver station deployed in a borehole on land or below the seabed.

The multicomponent measurement can be used to measure a strain field.

A stress field can be derived from the strain field.

The stress field can be derived from the strain field by Hooke's law.

At least one receiver location can comprise a receiver station comprising a cluster of pressure sensors, such as hydrophones. A separation between adjacent pressure sensors in the cluster can be from 1 cm to 10 m, for example from 1 cm to 1 m, or 5 cm to 1 m, or from 10 cm to 10 m.

A multicomponent unit can be arranged by use of multiple pressure sensors in a confined volume, involving numerous pressure sensors with a separation between 1 cm (or 10 cm) to 10 m, for example from 1 cm to 1 m or 5 cm to 1 m, to be recorded as individual sensor signals or "hardwired" to output only selected components.

Each recording station can be anchored to the seabed, and consist of several multicomponent units. The units can be distributed upwards in the watercolumn, by means of floating devices and rope or more rigid structures.

The method can further comprise measuring at least one non-seismic geophysical field.

The at least one non-seismic geophysical field can comprise at least one of an electromagnetic field, a gravity field and a magnetic field.

According to a fourth aspect of the present invention, there is provided a method of processing seismic data acquired by actuating a seismic source at a plurality of source locations and, for each source location, performing a multicomponent seismic measurement at at least one receiver location, the method comprising applying a reconstructing method to each multicomponent measurement to obtain additional data corresponding to source locations additional to the source locations at which the source was actuated.

According to a fifth aspect of the present invention, there is provided a method of processing seismic data acquired by actuating a seismic source at at least one source location and, for each source location, performing a multicomponent seismic measurement at a plurality of receiver locations, the method comprising applying a reconstructing method to each multicomponent measurement to obtain additional data corresponding to receiver locations additional to the receiver locations at which the multicomponent measurement was performed.

According to a sixth aspect of the present invention, there is provided a method of processing seismic data acquired by actuating a seismic source at a plurality of source locations and, for each source location, performing a multicomponent seismic measurement at a plurality of receiver locations, the method comprising applying a reconstructing method to each multicomponent measurement to obtain additional data corresponding to source locations additional to the source locations at which the source was actuated and/or additional data corresponding to receiver locations additional to the receiver locations at which the multicomponent measurement was performed.

The step of applying a reconstructing method can comprise applying a reconstructing and/or interpolating filter.

According to a seventh aspect of the present invention, there is provided a method of acquiring seismic data for processing by a method according to the fourth aspect of the present invention comprising actuating a seismic source at a plurality of source locations and/or, for each source location, performing a multicomponent seismic measurement at at least one receiver location.

According to an eighth aspect of the present invention, there is provided a method of acquiring seismic data for processing by a method according to the fifth aspect of the present invention comprising actuating a seismic source at at least one source location and/or, for each source location, performing a multicomponent measurement at a plurality of receiver locations.

According to a ninth aspect of the present invention, there is provided a method of acquiring seismic data for processing by a method according to the sixth aspect of the present invention comprising actuating a seismic source at a plurality of source locations and/or, for each source location, performing a multicomponent measurement at a plurality of receiver locations.

The seismic data can comprise marine seismic data and the seismic source can comprise a marine seismic source.

Actuating a seismic source at a plurality of source locations can comprise actuating a seismic source at a plurality of source locations in turn.

According to a tenth aspect of the present invention, there is provided an apparatus for performing a method according to the seventh, eighth or ninth aspect of the present invention, comprising at least one receiver station for performing a multicomponent seismic measurement.

The or each receiver station can comprise multiple hydrophones to measure pressure and derive spatial derivatives (gradients) therefrom, and/or multiple geophones to measure particle velocities and derive particle velocity derivatives (gradients) or spatial pressure derivatives therefrom, and/or multiple accelerometers to measure accelerations and derive particle acceleration derivatives (gradients) or spatial pressure derivatives therefrom, and/or sensors to measure rotational motions around an axis to derive spatial derivatives of any physical fields such of particle component velocity.

At least one receiver station can be as described above.

At least one receiver station can be disposed on or above the seabed, and/or in at least one cable on the seabed and/or orientated vertically in the water column.

At least one receiver station can be deployed in a borehole on land or below the seabed.

At least one receiver station can comprise a cluster of pressure sensors, such as hydrophones, for example with a separation between adjacent pressure sensors in the cluster of 1 cm (or 10 cm) to 10 m, for example from 1 cm to 1 m or 5 cm to 1 m.

According to a further aspect of the present invention, there is provided a method of providing marine seismic data, the method comprising the steps of:

actuating a marine seismic source at a plurality of source locations in turn;

for each source location, performing a multicomponent seismic measurement at at least one receiver location; and applying a reconstructing and/or interpolating filter to the or each multicomponent measurement to obtain pressure data and/or vertical particle velocity component related data corresponding to source locations additional to the source locations at which the source was actuated.

The vertical velocity component related data can comprise at least one of vertical velocity component data, vertical particle displacement component data, and vertical acceleration component data.

Each of the additional locations can be disposed between ones of the source locations at which the source was actuated.

The source locations at which the source was actuated can comprise a regular grid. The grid is preferably one of a triangular grid, a rectangular grid and a hexagonal grid.

Each multicomponent measurement can comprise pressure data and particle velocity related data.

Each multicomponent measurement can comprise pressure measurement and measures of derivatives of pressure with respect to first and second different horizontal directions. The first and second directions can be horizontal Cartesian coordinate directions, for example.

Each multicomponent measurement comprises vertical particle component velocity measurement and measures of derivatives of vertical particle component velocity with respect to third and fourth different horizontal directions. The third and fourth directions can be horizontal Cartesian coordinate directions, for example.

Each of the derivatives can be a first or second or third order derivative, and the interpolating filter can be a sinc squared or sinc cubed or sinc to the power four interpolation filter.

Each derivative can be formed from a measurement of difference.

The receiver location or each receiver location can be fixed.

The receiver location or each receiver location can comprise a receiver station disposed on or above the seabed, and/or in at least one cable on the seabed and/or orientated vertically in the water column.

The receiver location or each receiver location can comprise a receiver station deployed in a borehole on land or below the seabed. The multicomponent measurement can be used to measure a strain field. A stress field can be derived from the strain field. The stress field can be derived from the strain field by Hooke's law.

The method further can comprise measuring at least one non-seismic geophysical field. The at least one non-seismic geophysical field can comprise at least one of an electromagnetic field, a gravity field and a magnetic field.

According to a further aspect of the present invention, there is provided a method of processing marine seismic data acquired by actuating a marine seismic source at a plurality of source locations in turn and, for each source location, performing a multicomponent seismic measurement at at least one receiver location, the method comprising applying a reconstructing and/or interpolating filter to the or each multicomponent measurement to obtain pressure data and/or vertical particle velocity component related data corresponding to source locations additional to the source locations at which the source was actuated.

The method can comprise actuating a marine seismic source at a plurality of source locations in turn and, for each source location, performing a multicomponent seismic measurement at at least one receiver location.

According to a further aspect of the present invention, there is provided an apparatus for performing a method of processing marine seismic data acquired by actuating a marine seismic source at a plurality of source locations in turn and, for each source location, performing a multicomponent seismic measurement at at least one receiver location, the method comprising applying a reconstructing and/or interpolating filter to the or each multicomponent measurement to obtain pressure data and/or vertical particle velocity component related data corresponding to source locations additional to the source locations at which the source was actuated. The apparatus comprises at least one receiver station for performing a multicomponent seismic measurement.

The receiver station or each receiver station can comprise multiple hydrophones to measure pressure and derive spatial derivatives (gradients) therefrom, and/or multiple geophones to measure particle velocities and derive particle velocity derivatives (gradients) therefrom, and/or multiple accelerometers to measure accelerations and derive particle acceleration derivatives (gradients) therefrom, and/or sensors to measure rotational motions around an axis to derive spatial derivatives of any physical fields.

A program is also proposed for controlling an apparatus to perform a method as herein proposed, or which, when loaded into an apparatus, causes the apparatus to become an apparatus as herein proposed. The program can be carried on a carrier medium. The carrier medium can be a storage medium. The carrier medium can be a transmission medium. An apparatus programmed by such a program is also envisaged, as is a storage medium containing such a program.

BRIEF DESCRIPTION OF THE DRAWINGS

FIG. 5: (a) Two different sinusoids that produce the samples marked with white dots having solid outline; (b) and (c) The red signal is sampled at the white dots with solid outline. The dots with diagonal hatching, vertical hatching and horizontal hatching are reconstructed values with the sampling theorems A.7, A.8, and A.9, called sinc, $sinc^2$ and $sinc^3$ interpolation, respectively.

DETAILED DESCRIPTION

Figure 1A:
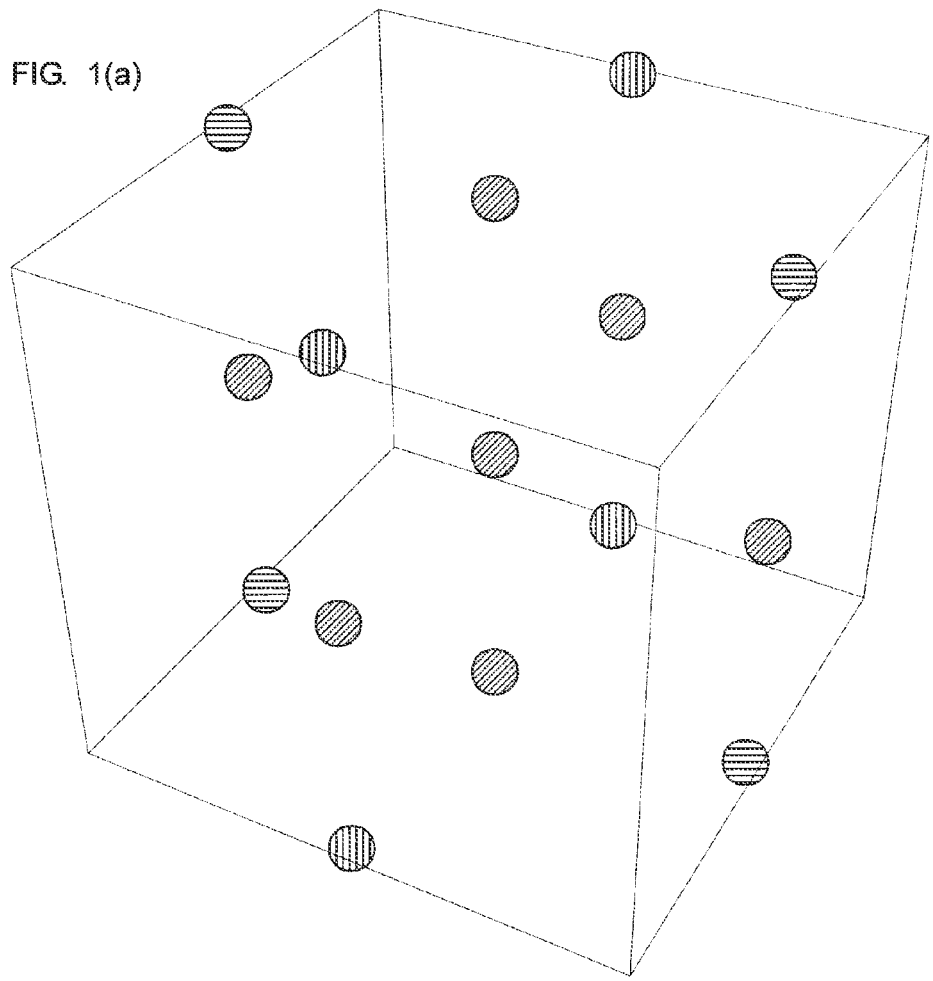
FIG. 1(a) illustrates fifteen hydrophones (represented by dots) in a cluster. The seven dots with diagonal hatching are oriented along the axes of a Cartesian coordinate system at locations $(0, 0, 0)$, $(\pm 1, 0, 0)$, $(0, \pm 1, 0)$ and $(0, 0, \pm 1)$. The four dots with horizontal hatching are at locations $(\pm 1, 0, \pm 1)$. The four dots with vertical hatching are at locations $(0, \pm 1, \pm 1)$. The hydrophone spacing along axes is unity.

As mentioned above, to reduce 3-D marine seismic acquisition cost the receiver spacing is often made larger than desirable. As a consequence, the recorded wavefield is spatially aliased. Specifically, in towed streamer acquisition, the sampling challenge is the large streamer separation, typically 50-100 m. In ocean-bottom seismic (OBS) or vertical cable (VC) acquisition, where data can be processed as common-receiver gathers, it is the coarse shot interval spacing, typically chosen 50 m by 50 m or more, that leads to undersampling. The undersampling of the wavefield causes challenges for 3-D up/down decomposition or deghosting of the recorded wavefield, which is one of the data preprocessing steps applied before seismic imaging.

The concept of multicomponent (e.g. six-component or 6-C) wavefield measurements is introduced in the water column while the source vessel, just like in OBS and VC surveying, traverses the surface shooting on a predetermined grid. At least six wavefield components—the pressure and the vertical component of the particle velocity and their horizontal first-order derivatives in x- and y-directions—are suggested for proper reconstruction of the undersampled pressure and vertical component of particle velocity. When the second-order derivatives are recorded, the number of components is ten. This reconstruction allows the step of 3-D up/down decomposition or deghosting of common receiver station recordings to be achieved in the frequency-wavenumber domain (Amundsen, 1993). New wavefield reconstruction methods such as those presented here are of interest since, presently, the seismic industry is in the process of developing multicomponent cables or streamers (Robertsson, 2006; Singh et al., 2009). Further, the industry is actively carrying out research on and testing new multicomponent sensors (H. Lund, pers. comm.). Here, multicomponent refers to a combination of sensors that includes two or more closely-spaced sensors such as a hydrophone, a geophone, an accelerometer, a rotational seismometer, a pressure derivative configuration of hydrophones, or a vertical particle velocity derivative configuration of hydrophones. The derivatives can be a first order derivative, a second order derivative or a higher order derivative. Rotational seismometers are designed for measurements of the rotational components (angular velocity) of x-, y- or z-axis oriented vibrations.

Before it is described further and demonstrated the use of 6-C and 10-C common-receiver recordings for reconstruction of pressure and vertical component of particle velocity, the reader is again referred to the above-provided brief review of the state-of-the-art and possible new trends in marine seismic acquisition. With regard to the Robertsson et al. (2006, 2008)

disclosure, it is noted that a true multi-C streamer would enable accurate pressure data reconstruction in the crossline direction with cable separations for which pressure-only data would be irrecoverably aliased. The major purpose of having a hydrophone/3-C geophone streamer is thus to achieve crossline pressure field reconstruction by interpolation using pressure and its crossline derivative. But without introducing assumptions such a streamer will not enable the reconstruction of the vertical component of the particle velocity in the crossline direction that is needed to achieve the 3-D up/down decomposition objective.

In marine OBS or VC surveying, the shot grid interval is seldom less than 50 m by 50 m to avoid excessive exploration cost. The 50 m by 50 m shot grid implies that any recorded pressure and vertical component of particle velocity data alone at a receiver station will be undersampled even for moderate frequencies of the source signal. For example, a seismic event with water speed will be aliased above 15 Hz.

With the purpose to achieve a proper 3-D up/down wavefield decomposition of undersampled seismic data, it is suggested to record six components or more of the wavefield in OBS or VC surveying configurations. The six-components are the pressure and its horizontal first-order derivatives in x- and y-directions, and the vertical component of the particle velocity and this component's horizontal first-order derivatives in x- and y-directions. The additional recordings of second-order derivatives give a ten-component measurement.

There are many ways to measure the first-order x- and y-derivatives of the pressure wavefield in the water column. One way is to use horizontally oriented geophones since the equation of motion relates measured particle velocities ($v_x$, $v_y$) to spatial derivatives of the pressure p. In particular, in the frequency ($\omega$) domain, for a fluid $$\partial_x p = i\omega\rho v_x, \partial_y p = i\omega\rho v_y, \quad (1)$$

where $\rho$ is density. Accelerations are related to particle velocities as $(a_x, a_y) = -i\omega(v_x, v_y)$. Another option is to construct a cluster of hydrophones with known separation between each hydrophone so that the spatial derivatives of the pressure can be derived by pressure field differencing.

Likewise, there are several ways to measure the first-order x- and y-derivatives of the vertical component of the particle velocity $v_z$ in the water column. One way is to use rotational seismometers designed for measurements of the rotational components (angular velocity) of seismic z-axis oriented vibrations. Another possibility is to construct a cluster of vertically oriented geophones with known separation between each geophone so that the spatial derivatives of the particle velocity can be derived by velocity field differencing.

In the processing of OBS and VC data, one takes advantage of the principle of acoustic reciprocity (Ikelle and Amundsen, 2005). For hydrophone data, reciprocity states that a monopole point source of volume injection and a receiver can be interchanged without affecting the recorded signal. This principle holds also for the derivatives of the acoustic data. Therefore, the multicomponent common receiver gather can be considered as a multicomponent common shot gather to which 3D data reconstruction is applied, up/down wavefield decomposition, waveequation demultiple, and shot-profile waveequation migration to obtain a partial image of the subsurface geology. The sum of all partial images, one from each receiver in the OBS experiment, then gives the full seismic image.

Figure 1B:
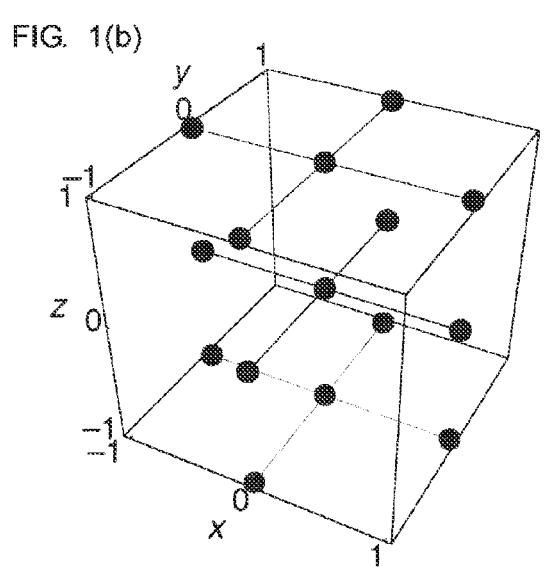
FIG. 1(b) illustrates the same fifteen hydrophones of FIG. 1(a), but more clearly shown in three layers of hydrophones.

Another example of a receiver system that could provide the six or ten components of the wavefield suggested for wavefield reconstruction and proper up/down wavefield decomposition would be fifteen clustered hydrophones as illustrated in FIG. 1(a) where three are staggered in the vertical direction at depths z and z±Δz at horizontal positions (x, y), (x±Δx, y), and (x, y±Δy). A ten hydrophone cluster could consist of two hydrophone layers at depths z and z+Δz, each layer having five hydrophones at horizontal positions (x, y), (x±Δx, y), and (x, y±Δy). The fifteen hydrophone cluster is similar but has an additional layer of five hydrophones at depth z−Δz, and compared to the ten hydrophone cluster offers redundancy and improved signal/noise ratio as the vertical derivatives of the pressure can be calculated from hydrophone measurements in three ways. A five-hydrophone cluster could have a single hydrophone layer at depth z, with hydrophones at horizontal positions (x, y), (x±Δx, y), and (x, y±Δy); such a cluster can only measure the pressure field and its horizontal derivatives. FIG. 1(b) shows more clearly these three layers making up the five-, ten- and fifteen-hydrophone clusters.

Thus, the pressure wavefield can be recorded in 10 or 15 neighboring points in space, allowing all the ten sought-after components of the field to be derived by simple field differencing operations. Such a system can be designed and installed in a receiver station deployed on the sea floor or in a vertical cable system.

Then, the pressure wavefield would be recorded in fifteen closeby points in space, allowing all the six sought-after components of the field to be derived by simple field differencing operations. Such a system can be designed and installed in a receiver station deployed on the sea floor.

This hydrophone layout not only allows the first order spatial derivatives to be evaluated, it also allows the computation of second order spatial derivatives. The art of numerical differentiation is well known in the field of mathematics and is described in standard mathematical textbooks (e.g., Abramowitz and Stegun, 1972).

It will also be appreciated that $\partial_x v_z = \partial_z v_x$ and $\partial_y v_z = \partial_z v_y$, so that $\partial_x v_z$ and $\partial_y v_z$ can be found by measuring $\partial_z v_x$ and $\partial_z v_y$ respectively instead, which can be easier in practice.

A numerical example will now be described.

A simple synthetic shot gather of pressure and its horizontal derivatives is generated, (p, $\partial_x p$, $\partial_y p$), and vertical component of particle velocity and its horizontal derivatives, ($v_z$, $\partial_x v_z$, $\partial_y v_z$), to illustrate the significance of multicomponent (e.g. 6-C) recordings for the reconstruction of pressure and vertical component of particle velocity data between recording locations. Any interpolation technique that uses and benefits from field and field derivative measurements can be applied. In Appendix A infra, one class of such reconstruction methods based on the extended sampling theorem is outlined, discussed and exemplified. In the case that only the field is measured, the sampling theorem reduces to the well-known sinc interpolation. When the field and its first derivatives are measured and used in the extended sampling theorem, the method for $\text{sinc}^2$ interpolation is called. In the case that the field and its first and second derivatives are measured and used, the method for $\text{sinc}^3$ interpolation is called.

Figure 6:
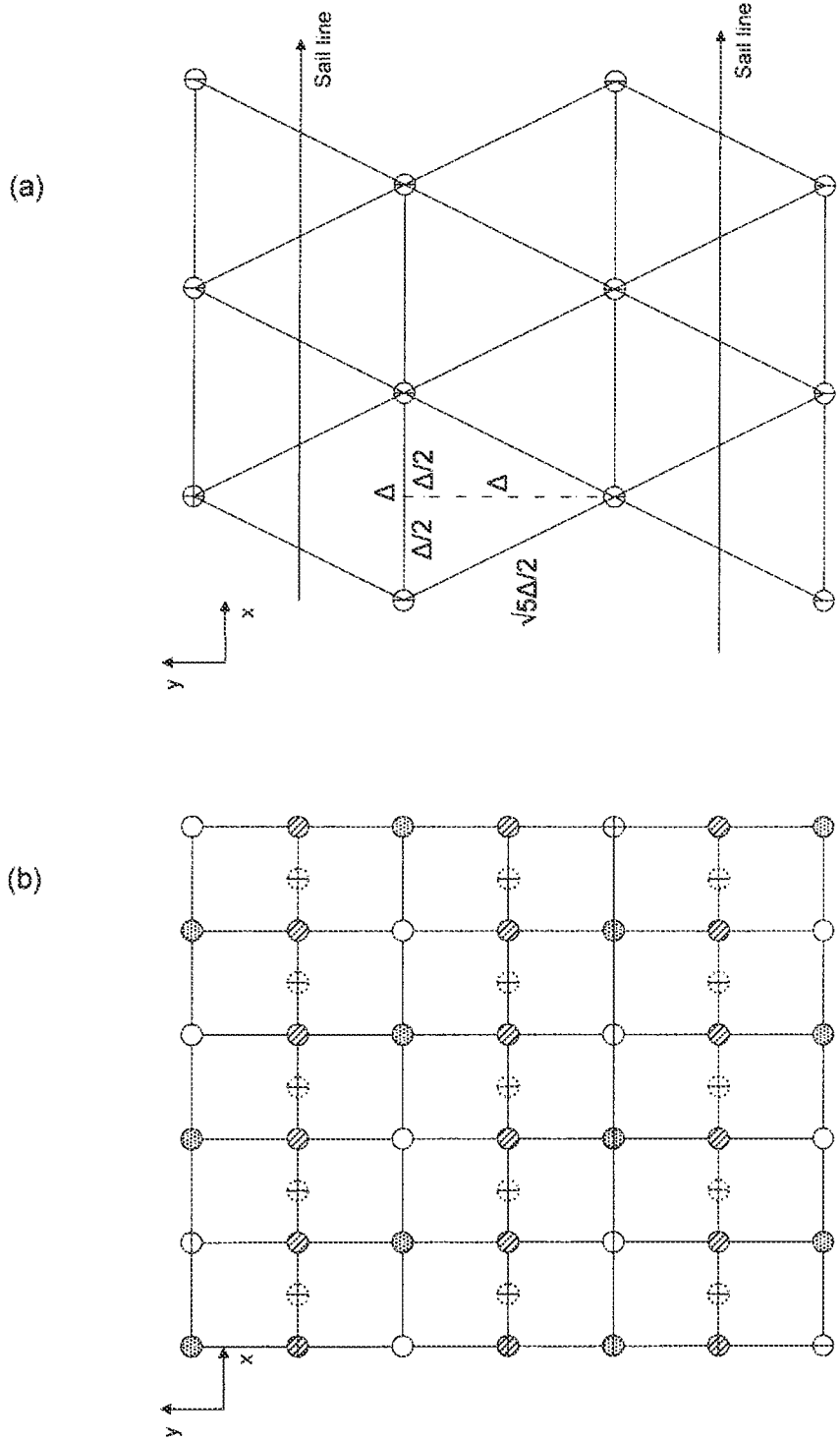
FIG. 6: Procedure for data reconstruction: (a) Data are sampled in locations marked with solid-outline white circles; (b) Data are reconstructed in locations marked with circles having interior shading and diagonal hatching.

A homogeneous halfspace of water below a free surface is considered. A point source is located at position $(x_s, y_s, z_s) = (0, 0, 300)$ m. The source wavelet has frequencies up to 30 Hz. The receivers are located over a horizontal plane at depth $z_r = 100$ m. The offset range is ±3 km in both horizontal directions. In the numerical example, the receiver spacing interval $\Delta x = \Delta y = 50$ m is selected but every second line is staggered by $\Delta x/2$ as discussed in Appendix B and shown in FIG. 6. The data at the receiver plane simply consist of an upgoing wave from the source and a downgoing wave reflected at the free surface.

In this numerical example the benefit of sinc² interpolation is demonstrated. A 6-C component data gather is generated that consists of pressure and its horizontal derivatives, (p, $\partial_x$p, $\partial_y$p), and vertical component of particle velocity and its horizontal derivatives, ($v_z$, $\partial_x v_z$, $\partial_y v_z$). The source wavelet has dominant frequency of 14 Hz. Its amplitude spectrum is tapered to zero above 30 Hz.

Figure 2:
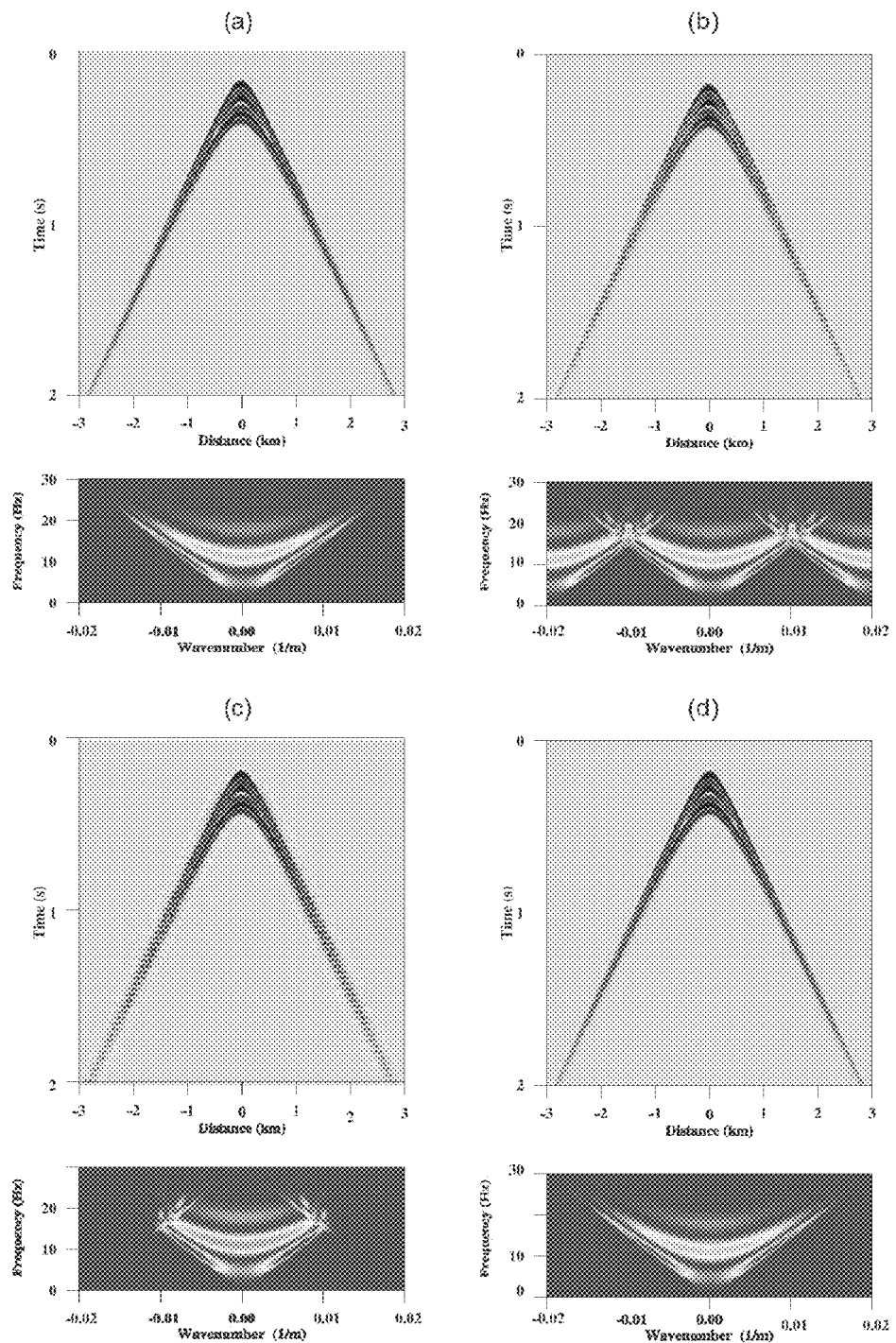
FIG. 2 provides a comparison of sinc and $sinc^2$ interpolation on simple synthetic vertical component of particle velocity data. (a) Reference data (ideal result), (b) data after 2:1 decimation, (c) sinc interpolation, (d) $sinc^2$ interpolation. t-x data are displayed above their f-k spectra.

FIG. 2 shows the results of two interpolation and reconstruction tests for p. The results for $v_z$ are not shown here but are similar. The upper and lower parts show selected 2-D gathers in time-offset (t-x) and frequency-wavenumber (f-k) domains, respectively. The t-x gather is that for y=$y_s$. FIG. 2(a) shows modeled reference data sampled at 25 m that would be the ideal result from any reconstruction technique. These data are now decimated spatially by a factor of two so that the sampling interval is 50 m, see FIG. 2(b). Aliasing is clearly visible in the f-k domain.

In the subsequent tests, these data are now interpolated.

First, traditional sinc interpolation is applied using as input p data to reconstruct p data and $v_z$ data to reconstruct $v_z$ data. Sinc interpolation of aliased data makes no attempt to de-alias the data before interpolation. Thus, when aliasing is present in single component data acquisition, it is not possible to identify the correct waveforms from the acquired samples, unless assumptions are introduced. Therefore, not surprisingly, the aliased components of the events are interpolated incorrectly as seen in FIG. 2(c) where data are band-limited in the spatial sampling bandwidth.

Second, sinc² interpolation band-limited up to twice the spatial Nyquist frequency is applied, as introduced in Appendix A. Input data (p, $\partial_x$p, $\partial_y$p) are used to reconstruct p, and input data ($v_z$, $\partial_x v_z$, $\partial_y v_z$) are used to reconstruct $v_z$ (not shown). FIG. 2(d) shows that the data are well reconstructed. The data derivative information effectively has doubled the spatial Nyquist frequency, so that the data are not aliased.

In conclusion, it is shown that recordings of the horizontal derivatives of pressure and vertical component of particle velocity in OBS or VC surveying have the potential to reduce aliasing by a factor of at least two and three compared to recording only pressure and vertical component of particle velocity data alone. Using a simple synthetic data set, the potential that these new measurements have to reconstruct data at desired locations in between the original shot grid is demonstrated.

Any interpolation technique that uses sampled values of the field and field horizontal derivatives can be applied in the data reconstruction. Here, the extended sampling theorem was used in the form of sinc² and sinc³ interpolation. Compared with conventional sinc interpolation, sinc² and sinc³ interpolation doubles and triples the effective Nyquist wavenumber, respectively. Input to sinc² interpolation is the field and its first-order horizontal derivatives. Sinc³ interpolation has as input, in addition, the second-order horizontal derivatives.

To apply sinc² interpolation before 3D OBS or VC up/down wavefield decomposition, wave-equation demultiple and wave-equation migration, six wavefield components are acquired. Similarly, for sinc³ interpolation, ten wavefield components are acquired.

Figure 3:
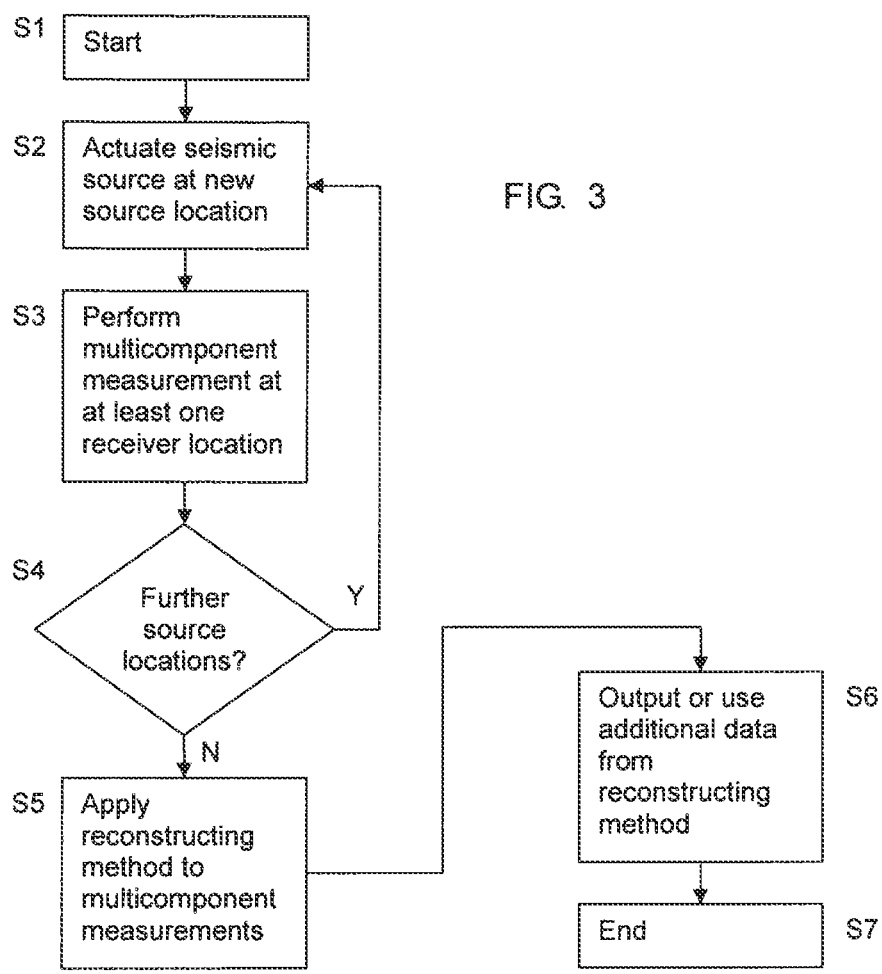
FIG. 3 is a schematic representation of a method embodying the present invention.
Figure 4A:
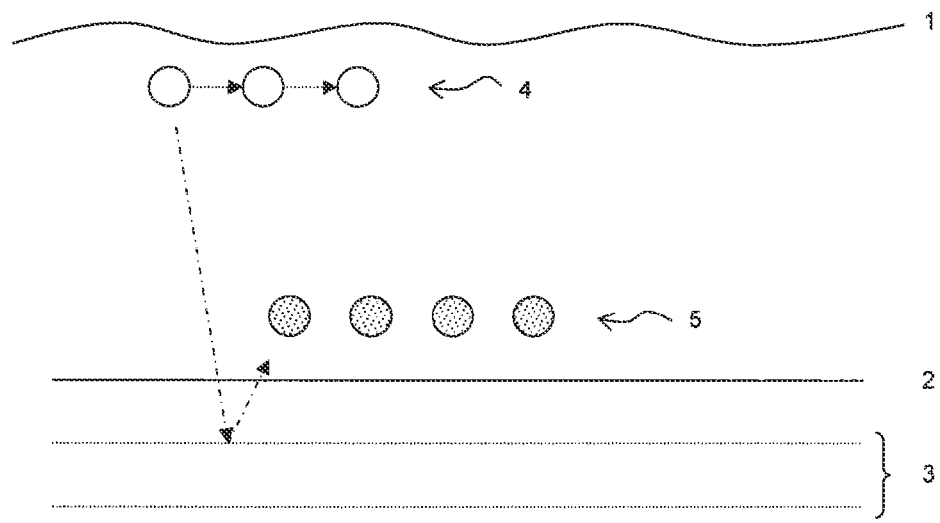
FIGS. 4(a) and 4(b) are schematic illustrations of apparatus used in an embodiment of the present invention, in a marine and non-marine environment respectively.
Figure 4B:
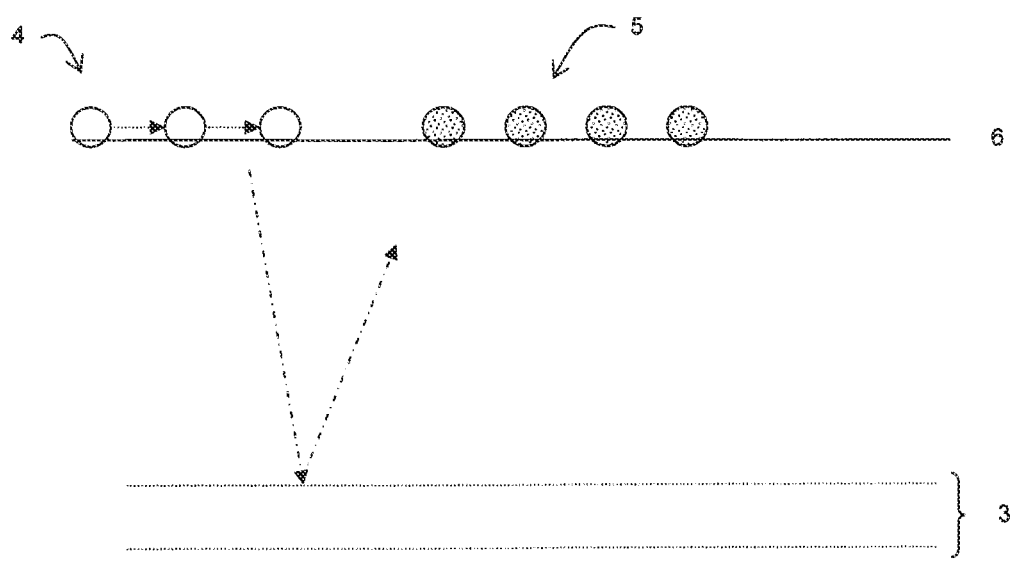

A method according to an embodiment of the present invention is illustrated schematically in the flowchart of FIG. 3. A method embodying the present invention will be described with reference first to FIG. 4(a), in which the method is performed within a marine environment to provide marine seismic data. However, the method is equally applicable to a non-marine environment, and the application to a non-marine environment will then be briefly discussed with reference to FIG. 4(b). Illustrated in FIGS. 4(a) and 4(b) are a sea surface 1, a sea floor 2, a sub-surface structure 3, a seismic source 4, at least one receiver 5, and a land surface 6. Within the context of FIG. 4(a), the seismic source 4 is a marine seismic source. It is noted that the arrangements in FIGS. 4(a) and 4(b) are intended to be schematic rather than literal.

An embodiment of the present invention within the context shown in FIG. 4(a) relates to a method of providing marine seismic data. As discussed previously, there are various ways of providing the at least one receiver 5, as well as various ways of providing the marine seismic source 4 and moving it between desired source locations. For example, the at least one receiver 5 could be provided by towed streamer, fixed to the sea floor 2, arranged off the sea floor 2, and so on. Similarly, there could be a single source 4 moved to different source locations, or a plurality of sources 4 at different respective source locations—which could be fixed—or a combination of these. The details are not important within the context of an embodiment of the present invention.

The method starts at step S1. In a marine environment as illustrated in FIG. 4(a), the marine seismic source 4 is actuated at a plurality of source locations in turn. This is illustrated by step S2 of FIG. 3, with step S4 being a check to determine whether there are any further source locations; if there are further source locations then the method loops back to step S2, and if not then the method proceeds to step S5. The seismic waves from the source 4 are reflected by sub-surface structure, as up-going waves, towards the at least one receiver 5. For each source location, a multicomponent seismic measurement is performed by the at least one receiver 5 at at least one corresponding respective receiver location (step S3 of FIG. 3). A reconstructing (or interpolating) method (or filter) is applied to each multicomponent measurement in step S5 to obtain additional data corresponding to source locations additional to the source locations at which the source was actuated. The additional data are output and/or used in step S6. The method ends at step S7.

In a non-marine environment such as that illustrated in FIG. 4(b), the method is entirely equivalent, even if the locations of the seismic source 4 and the at least one receiver 5 are different. In the example shown in FIG. 4(b), the seismic source 4 and the at least one receiver are provided at or near the land surface 6. Again, there are various ways of providing the at least one receiver 5, as well as various ways of providing the seismic source 4 and moving it between desired source locations. There could be a single source 4 moved to different source locations, or a plurality of sources 4 at different respective source locations—which could be fixed—or a combination of these. The at least one receiver 5 and/or the seismic source 4 can be located within at least one corresponding respective borehole rather than being arranged at or near the land surface 6. The details are not important within the context of an embodiment of the present invention.

Various subsidiary features of an embodiment of the present invention, as well as additional aspects of the present invention, are set out in the Summary section above.

It will be appreciated by the person of skill in the art that various modifications can be made to the above described embodiments without departing from the scope of the present invention.

In particular, it will be appreciated that rather than (or in addition to) having a plurality of source locations and at least one receiver location, with reconstruction/interpolation of additional data corresponding to additional source locations, it is also possible to provide at least one source location and a plurality of receiver locations, with reconstruction/interpolation of additional data corresponding to additional receiver locations. Reconstruction or interpolation based on receiver locations would be achieved in a manner entirely analogous to reconstruction or interpolation based on source locations as described herein, and the skilled person would readily be able to put this into practice based on the disclosure herein. Such a method of providing seismic data would comprise the steps of: actuating a seismic source at at least one source location; for each source location, performing a multicomponent seismic measurement at a plurality of receiver locations; and applying a reconstructing method to each multicomponent measurement to obtain additional data corresponding to receiver locations additional to the receiver locations at which the multicomponent measurement was performed (the schematic flowchart of FIG. 3 applies to this method, though step S3 would be one of performing a multicomponent seismic measurement at a plurality of receiver locations). For example, with one shot and several receivers the data registered by the receivers can be used to interpolate between them. Reconstructing in this way between multicomponent receivers, in particular reconstructing between stationary multicomponent receivers at or close to the seabed, or between receivers in vertical cables, is not envisaged by known techniques.

The present application is based on GB 1005574.7 and U.S. 61/321,670, and the reader is also referred to those earlier applications; if necessary, the entire content of those earlier applications is hereby incorporated by reference in order to provide explicit basis in this application for resolving any possible discrepancies in the present application (for example in converted mathematical expressions and equations) and/or for the benefit of any color-related information included on filing those earlier applications.

The present application is also to be read in conjunction with Amundsen et al. (2010), the entire content of which is hereby incorporated by reference. Amundsen et al. (2010) discloses the same underlying technique as disclosed herein, but contains some additional analysis relevant to the present application, for example equations (12) and (13) and associated description and references thereto. Also, while FIG. 2 of Amundsen et al. (2010) corresponds to FIG. 2 of the present application, Amundsen et al. (2010) also contains additional examples and analysis in FIGS. 3 to 6 and associated description, including an additional section entitled "sinc$^3$ interpolation" just before the Conclusion section which refers to FIG. 6 of Amundsen et al. (2010).

REFERENCES

Abramowitz, M. and I. A. Stegun, 1972, Handbook of mathematical functions: Dover Publ.
Amundsen, L., 1983, Wavenumber-based filtering of marine point source data, Geophysics, 58, 1335-1348.
Amundsen, L., 2001, Elimination of free-surface related multiples without need of the source wavelet: Geophysics, 66, 327-341, no. 1, V1-V9.
Amundsen, L., Westerdahl, H., Thompson, M., Haugen, J. A., Reitan, A., Landro, M. and Ursin, B., 2010, Multicomponent ocean bottom and vertical cable seismic acquisition for wavefield reconstruction, Geophysics, Vol. 75, No. 6, November-December 2010.
Bardan, V., 1997, A hexagonal sampling grid for 3D recording and processing of 3D seismic data: Geophysical Prospecting, 45, no. 5, 819-830, doi: 10.1046/j.1365-2478.1997.600300.x.
Berni, A. J., 1984, Marine seismic system: U.S. Pat. No. 4,437,175.
Carlson, D., A. Long, W. Sllner, H. Tabti, R. Tenghamn, and N. Lunde, 2007, Increased resolution and penetration from a towed dual-sensor streamer: First Break, 25, 71-77.
Ikelle, L. T. and L. Amundsen, 2005, Introduction to petroleum seismology: Society of Exploration Geophysics.
Linden, D. A., 1959, A discussion of sampling theorems: Proceedings of the Institute of Radio Engineers, 47, 1219-1226.
Poularikas, A. D., 1996, The transforms and applications hand-book: CRC Press.
Robertsson, J. O. A., 2006, Interpolation and extrapolation method for seismic recordings: G.B. Patent 2,414,299.
Robertsson, J. O. A., I. Moore, M. Vassallo, A. K. Ozdemir, D. J. van Manen, and A. Özbek, 2008, On the use of multicomponent streamer recordings for reconstruction of pressure wavefields in the crossline direction, Geophysics, 73, no. 5, A45-A49.
Ruehle, W. H., 1984, Pressure and velocity detectors for seismic exploration: U.S. Pat. No. 4,486,865.
Sheriff, R. E., and L. P. Geldart, 1995, Exploration seismology: Cambridge University Press.
Singh, R., J. O. A. Robertsson and O. Kristiansen, 2009, Seismic streamer system and method: G.B. Patent 2,425, 596.

APPENDIX A

The Extended Sampling Theorem

In this section, it is shown that the extended sampling theorem (Poularikas, 1996) gives one possible basis for data reconstruction.

Let $\Delta$ denote a sampling interval and $$\kappa_N = \frac{1}{2\Delta}$$

the Nyquist wavenumber. Let p(x) be a continuous function with finite Fourier transform $F(k)[F(k)=0$ for $|k|>2\pi\kappa_N]$. Introduce the points $$x_m = m\Delta, \; m=0,\pm1,\pm2, \tag{A.1}$$

and define $$h=(R+1)\Delta, R=0,1,2, \tag{A.2}$$

The extended sampling theorem (Poularikas, 1996) shows how the function can be reconstructed from itself and its derivatives $p^{(R)}$ up to order R at the points $mh=(R+1)x_m$ via the formula $$p(x) = \sum_{m=-\infty}^{\infty} \left[ p(mh) + (x-mh)g^{(1)}(mh) + \ldots + \frac{(x-mh)^R}{R!} g^{(R)}(mh) \right] \times \sin c^{(R+1)}\left[\frac{1}{h}(x-mh)\right] \tag{A.3}$$

where $$g^{(j)}(mh) = \sum_{i=0}^{j} \binom{j}{i}\left(\frac{\pi}{h}\right)^{j-i} \Gamma_{R+1}^{(j-i)} p^{(i)}(mh) \tag{A.4}$$

-continued $$\operatorname{sinc}(t) = \frac{\sin(\pi t)}{\pi t} \quad (A.5)$$

and $$\Gamma_\alpha^{(\beta)} = \frac{d^\beta}{dt^\beta}\left[\left(\frac{t}{\sin t}\right)^\alpha\right]_{t=0}$$

and in particular:

$$\Gamma_\alpha^{(0)} = 1, \quad (A.6)$$

$$\Gamma_\alpha^{(2)} = \frac{\alpha}{3},$$

$$\Gamma_\alpha^{(4)} = \frac{\alpha(5\alpha + 2)}{15}, \ldots, \Gamma_\alpha^{(\beta)} = 0 \text{ for odd } \beta$$

In the case only the function is sampled, use R=0 in equation A.4. Then h=Δ and Shannon's sampling theorem is obtained:

$$p(x) = \sum_{m=-\infty}^{\infty} p(x_m)\operatorname{sinc}\left[\frac{1}{\Delta}(x - x_m)\right] \quad (A.7)$$

This result is known also as sinc interpolation.

When the function and its first-order derivative are available, use R=1 in equation A.4. Then h=2Δ, $g^{(1)}=p^{(1)}$, and the multichannel sampling theorem is obtained (Linden, 1959; Robertsson et al., 2008):

$$p(x) = \sum_{m=-\infty}^{\infty} [p(2x_m) + (x - 2x_m)p^{(1)}(2x_m)] \times \operatorname{sinc}^2\left[\frac{1}{2\Delta}(x - 2x_m)\right] \quad (A.8)$$

From equation A.8, it is noted that when the function and its derivative is sampled, one can reconstruct functions sampled twice as coarsely as those reconstructed when only the function is available. Observe that the sinc function in the multichannel sampling theorem is squared. Therefore, for brief, this result is for $\operatorname{sinc}^2$ interpolation.

In the case that the function and its first and second order derivatives are sampled, use R=2 in equation A.4. Then h=3Δ. Further, $\Gamma_3^{(2)}=1$, $g^{(2)}=ap+p^{(2)}$ where $$a = \left(\frac{\pi}{3\Delta}\right)^2.$$

The function then can be reconstructed via the formula $$p(x) = \sum_{m=-\infty}^{\infty} \left[p(3x_m) + (x - 3x_m)p^{(1)}(3x_m) + \frac{(x - 3x_m)^2}{2}(ap(3x_m) + p^{(2)}(3x_m))\right] \times \operatorname{sinc}^3\left[\frac{1}{3\Delta}(x - 3x_m)\right] \quad (A.9)$$

From equation A.9, it is observed that when the function and its first and second-order derivatives are known, one can reconstruct functions sampled three times as coarsely as those reconstructed when only the function is available. Herein, this result is referred to as $\operatorname{sinc}^3$ interpolation.

APPENDIX A.1

Reconstruction of Sinusoid

Aliasing is an effect that causes different continuous signals to become indistinguishable (or aliases of one another) when sampled. When this happens, the original signal cannot be uniquely reconstructed from the sampled signal.

To illustrate reconstruction of signals by the use of the sampling theorems A.7, A.8, or A.9 sinusoid functions are used. Realistic signals are often modeled as the summation of many sinusoids of different frequencies and amplitudes (with a Fourier transform). Understanding what aliasing does to the individual sinusoids is useful in predicting what happens to their sum. In this section sinusoids sampled at time t=mΔ are considered where m takes integer values and the sample-interval is Δ=1 s. The sample-rate is $f_s=1/\Delta=1$ Hz.

In FIG. 5(a) the plot shows a set of samples (white dots with solid black outline), and two different sinusoids that could have produced the samples. The two sinusoids (or signals) are labeled and referred to herein as "red" and "black" (their actual color is not meaningful and/or relevant). Seven and a half cycles of the red sinusoid and two and a half cycles of the black sinusoid span an interval of 10 s. The respective sinusoid frequencies are $f_{red}$=0.75 Hz and $f_{black}$=0.25 Hz. Specifically, the continuous signals are $$\gamma_{red}=\cos(2\pi f_{red}t) \quad (A.10)$$

$$\gamma_{black}=\cos(2\pi f_{black}t) \quad (A.11)$$

Generally, when a sinusoid of frequency f is sampled with frequency $f_s$ the resulting samples are indistinguishable from those of another sinusoid of frequency $f_{image}(n)=|f-nf_s|$ for any integer n. Most reconstruction techniques produce the minimum of these frequencies.

A sufficient condition for signal reconstruction without aliasing is that $f_N=f/2>f$ where $f_N$ is commonly called the Nyquist frequency of a system that samples at rate $f_s$. Stated differently, as long as the signal frequency is lower than the Nyquist frequency, $f<f_N$, no aliasing occurs. But, as seen in this appendix, if derivatives of the signal are measured along with the signal, this situation changes. In the case that the signal and its first derivative are sampled, aliasing is avoided when $f<f_s=2f_N$. Further, when the signal and its first and second derivatives are sampled, aliasing does not occur as long as $$f < \frac{3}{2}f_s = 3f_N.$$

Assume that $\gamma_{red}$ is the original red signal with frequency f=0.75 Hz and that the white dots with solid black outline are the digital samples taken to record it. Observe that $f_N<f<2f_N$. The objective is to use one of the sampling theorems A.7, A.8, or A.9 to reconstruct the signal at sample locations $$t = \left(m + \frac{1}{2}\right)\Delta.$$

In the case only the signal is sampled, $\gamma_{red}$ obviously is undersampled, and sinc interpolation reconstructs the samples in FIG. 5(b) marked with dots having diagonal hatching. Clearly, the wrong signal $\gamma_{black}$ with image frequency $f_{image}$(1)=|0.75−1|Hz=0.25 Hz=$f_{black}$ is obtained by sinc interpolation. Since aliasing is present, it is not possible to identify the correct signal from the samples of signal alone.

Assume therefore that the first and second derivatives of the original red signal are taken together with the signal at the locations of the white dots with solid black outline. Applying $sinc^2$ and $sinc^3$ interpolation the samples marked with vertical and horizontal hatching are reconstructed, respectively, where it is seen that the horizontal hatching dots ($sinc^3$) are on top of the vertical hatching ($sinc^2$) dots. In this case, $\gamma_{red}$ together with its derivatives, is well-sampled, and both $sinc^2$ and $sinc^3$ interpolation reconstruct the proper samples. Even though the red and black signals have the same amplitudes on the sample locations, their derivatives at the sample locations are different. In this case, only the red signal has derivatives that fit the sampled derivatives of the signal. This example illustrates in an intuitive way why $sinc^2$ and $sinc^3$ interpolate beyond the Nyquist rate.

The red signal shown in FIG. 5(c) has frequency f=1.25 Hz so that $2f_N<f<3f_N$. Again, sinc interpolation reconstructs the samples marked with dots having diagonal hatching, fitting the black signal with image frequency $f_{image}$(1)=|1.25−1|Hz=0.25 Hz. Since the frequency of the red signal is above $2f_N$, now $sinc^2$ interpolation which utilizes both the signal and its first derivative at the sampling points cannot reconstruct the signal (see dots with vertical hatching). Note that $sinc^2$ interpolation amplifies relative to the original red signal the reconstructed amplitude values of the aliased signal marked with dots having vertical hatching. However, $sinc^3$ interpolation which uses both the signal and its first and second derivatives at the sampling points reconstructs the signal properly at the locations marked with dots having horizontal hatching. This example illustrates in a simple way why $sinc^3$ interpolates beyond twice the Nyquist rate.

APPENDIX B

Data Reconstruction from Staggered Shooting

In OBS swath or inline shooting the source vessel normally tows two airgun arrays while shooting 'flip-flop'. Assume that the sail lines in the x-direction are separated a cross-line distance 2Δ. The source lines where the shot interval is Δ have a cross-line offset of Δ/2 from the sail line. As a consequence of the flip-flop shooting, the shot locations of every second source line are staggered by the distance Δ/2. The shot point geometry is depicted in FIG. 6(a) where the solid-outline white circles denote the shot positions.

The objective is to use the sampled data from these shot positions to construct data in a desired shot grid that is regular with shot interval Δ/2. To this end, the first data reconstruction is performed along x-lines so that data are reconstructed at positions illustrated with circles having a shaded interior in FIG. 6(b). Second, data reconstruction is performed along diagonal lines normal to each other as shown in FIG. 6(a), where the shot interval is $\sqrt{5}\Delta/2$. Now data are reconstructed at positions marked with dotted-outline white circles in FIG. 6(b). Considering the dotted-outline white circle reconstructed shot locations along x-lines it is observed that these locations are offset by Δ/4 relative to shot locations in the desired grid. These offset shot locations can, without loss of precision, be shifted by interpolation a distance Δ/4 in the x-direction to fit the shot locations in the desired grid, marked with circles having diagonal hatching. The locations of the "solid-outline white", "shaded interior" and "diagonally hatched" circles are the locations of the reconstructed data, which if not spatially aliased, can be transformed to the frequency-wavenumber domain for up/down wavefield decomposition.

The procedure is the same when the objective is to construct data in a desired shot grid that is regular with shot interval Δ/4, and so on.

In the case that the sail lines are separated the crossline distance $\sqrt{3}\Delta/2\approx 0.87\Delta$, the shot sampling in FIG. 6(a) is known as hexagonal sampling (Bardan, 1997).

The invention claimed is:

1. An apparatus for use in a marine seismic survey, comprising:
a receiver station comprising a cluster of sensors configured to measure water pressure, a horizontal derivative of the pressure in two orthogonal directions, vertical particle velocity or acceleration of the water, and a horizontal derivative of the vertical particle velocity or acceleration in two orthogonal directions.

2. The apparatus of claim 1, wherein said sensors comprise one or more hydrophones for measuring said pressure.

3. The apparatus of claim 1, wherein said sensors comprise a plurality of horizontally oriented geophones or accelerometers configured to measure said horizontal derivative of the pressure in two orthogonal directions.

4. The apparatus of claim 1, wherein said sensors comprise a plurality of horizontally spaced hydrophones configured to measure said horizontal derivative of the pressure in two orthogonal directions by means of pressure field differencing.

5. The apparatus of claim 1, wherein said sensors comprise one or more geophones or accelerometers for measuring said vertical particle velocity or acceleration.

6. The apparatus of claim 1, wherein said sensors comprise a plurality of rotational seismometers configured to measure said horizontal derivative of the vertical particle velocity or acceleration in two orthogonal directions.

7. The apparatus of claim 1, wherein said sensors comprise a plurality of vertically oriented geophones or accelerometers with known separation between them and configured to measure said horizontal derivatives of the vertical particle velocity or acceleration in two orthogonal directions by velocity field differencing.

8. The apparatus of claim 1, wherein said sensors comprise a plurality of hydrophones arranged in two or more vertically spaced layers, the hydrophones of each layer being spaced apart in a horizontal plane.

9. The apparatus of claim 8, wherein said sensors comprise five or more hydrophones in each layer.

10. The apparatus of claim 1, wherein said sensors for measuring the horizontal derivatives of the vertical particle velocity or acceleration, are horizontally oriented geophones or accelerometers, or three component geophones or three component accelerometers, positioned at two or more different vertical levels in the receiver station.

11. The apparatus of claim 1, wherein said cluster of sensors are configured to measure one or more higher order horizontal derivatives of the pressure and vertical particle velocity.

* * * * *